United States Patent
Xu et al.

(10) Patent No.: US 7,664,396 B2
(45) Date of Patent: Feb. 16, 2010

(54) 1+1 PROTECTION METHOD OF SERVICES IN OBS NETWORKS, INTERSECTION NODE APPARATUS AND SERVICE PROTECTION SYSTEM

(75) Inventors: Huadong Xu, Shenzhen (CN); Ming Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/342,593

(22) Filed: Dec. 23, 2008

(65) Prior Publication Data
US 2009/0110394 A1 Apr. 30, 2009

Related U.S. Application Data

(63) Continuation of application No. PCT/CN2007/070245, filed on Jul. 5, 2007.

(30) Foreign Application Priority Data
Jul. 5, 2006 (CN) .................. 2006 1 0061520

(51) Int. Cl.
H04J 14/00 (2006.01)
(52) U.S. Cl. ................ 398/51; 398/54; 370/473; 370/464
(58) Field of Classification Search ........... 398/45, 398/51, 52, 54, 12, 19; 370/473, 468, 464
See application file for complete search history.

(56) References Cited

U.S. PATENT DOCUMENTS

| 7,561,800 B2 * | 7/2009 | Ryu et al. ................ 398/54 |
| 2002/0159482 A1 * | 10/2002 | Hans et al. .............. 370/493 |
| 2005/0063701 A1 | 3/2005 | Ovadia et al. |
| 2005/0232276 A1 * | 10/2005 | Glaser .................... 370/394 |
| 2006/0056286 A1 | 3/2006 | Lim et al. |

OTHER PUBLICATIONS

Elbiaze, "Quality of Service in OBS Networks: Issues, Challenges and Solutions," *Proceeding of the 8th International Conference on Transparent Optical Networks*, 3:23-26 (Jun. 2006).

(Continued)

*Primary Examiner*—M. R. Sedighian
(74) *Attorney, Agent, or Firm*—Leydig, Voit & Mayer, Ltd.

(57) ABSTRACT

A 1+1 protection method of service in optical burst switching (OBS) networks, an intersection node apparatus, and protection system of service are provided. The method discloses that burst packets bearing service are transferred through two risk-independent routes, and each burst packet corresponds to a control packet. The intersection node receives a first control packet transferred through either route with a sequence number, and then, when it continues to receive the second control packet, which is transferred through the other route with the same sequence number as the first control packet carries within the waiting time of the first control packet, the intersection node selects the burst packet corresponding to the control packet with a smaller quality loss field value of the first and second control packets. The present invention prevents the services from being cut down, and remarkably reduces the packet loss ratio of the service.

24 Claims, 2 Drawing Sheets

OTHER PUBLICATIONS

Farahmand et al., "A Layered Architecture for Supporting Optical Burst Switching," *Proceedings of the Advanced Industrial Conference on Telecommunications/Service Assurance with Partial and Intermittent Resources Conference/E-Learning on Telecommunications Workshop*, 213-218 (Jul. 2005).

Griffith et al., "A 1+1 Protection Architecture for Optical Burst Switched Networks," *IEEE Journal on Selected Areas in Communications*, 21(9): 1384-1398 (Nov. 2003).

Xu et al., "The Failure Disposal in the GMPLS Network," *Optical Communication Technology*, 4: 27-30 (Apr. 2005).

* cited by examiner

US 7,664,396 B2

1+1 PROTECTION METHOD OF SERVICES IN OBS NETWORKS, INTERSECTION NODE APPARATUS AND SERVICE PROTECTION SYSTEM

CROSS-REFERENCE TO RELATED APPLICATIONS

This application is a continuation of International Patent Application No. PCT/CN2007/070245, filed Jul. 5, 2007, which claims priority to Chinese Patent Application No. 200610061520.9, filed Jul. 5, 2006, both of which are hereby incorporated by reference in their entirety.

FIELD OF THE INVENTION

The present invention relates to the technical field of communication, and, in particular, to a 1+1 service protection method in OBS networks, an intersection node apparatus, and a service protection system in OBS networks.

BACKGROUND

Optical burst switching (OBS) is an optical switching technology newly developed in recent years. The basic principle of the OBS is to transfer the data and control information respectively through independent channels. An edge node of OBS networks assembles several IP packets having the same features, such as the same destinations and the same service levels into one burst packet. The control information in the form of packet sent earlier than the burst packet, referred to as a control packet, is used to reserve bandwidth resources for the burst packet at every intermediate node in a route to a destination node, so that the burst packet sent after the corresponding control packet remains in the optical domain all the time during the network transmission. Thus, the problem that the packet headers are processed one by one during the packet switching is avoided. At the same time, the demands for the optical buffer at the intermediate nodes of the network may be avoided or reduced.

A data switching network often needs to carry various different services. Some of them have high Quality of Service (QoS) requirements and economic or social values. The cutdown of these services due to network failures often causes great loss. Therefore, services superior to ordinary services must be provided for these services of higher authority levels. The service protection method against network failures is the most basic manner. Among all the protection manners against network failures, a 1+1 service protection is capable of transferring services simultaneously on two risk-independent routes and selecting the arrived data stream at a receiving end, thus reducing the impact of a single point network failure on the services to the minimum. The 1+1 service protection adopted in the OBS networks can eliminate the influence of the single point failure in the networks on the services carried by the network, provide differentiated services, and enhance the reliability of the transfer of important services. FIG. 1 shows a schematic diagram illustrating 1+1 service protection in OBS networks.

In a solution of the prior art, a conventional multi-protocol label switching (MPLS) 1+1 service protection strategy is introduced into the OBS network. The solution mainly includes the following processes. When establishing a session between a service source and a sink node, resources are reserved simultaneously on two risk-independent routes. A burst packet bearing service is replicated, in an appropriate manner, into two packets with the same content and number and the two burst packets are placed on the two routes, respectively, for transfer. Regarding a burst packet placed on either route for transfer, the sequence number of the burst packet is added in its corresponding control packet sent earlier than the burst packet. Moreover, a receiving window of the sequence number of the burst packet having a width of L is disposed at an intersection node where the two routes converge together. The value of L should be great than the maximum number of burst packets that may possibly be continuously lost on a single route. That is, when the network operates normally, the number of the packets that are continuously lost on a certain route from the source node to the sink node is smaller than L. Then, the receiving window filters the burst packets at the intersection node where the two routes converge together, based on the following principle. If the number (set to be N) of the burst packet carried by a control packet reaching the intersection node falls in the range of the current receiving window, this corresponding burst packet will be received, and meanwhile, the receiving window proceeds to the receiving range [N+1, N+L]; otherwise, this corresponding burst packet will be discarded.

FIG. 2 shows a schematic diagram illustrating conventional processes of selecting a packet by a receiving window at an intersection node, according to the aforementioned MPLS 1+1 service protection strategy. The processes are briefly described as follows. In FIG. 2, the receiving range of the receiving window is [1, L] initially. A packet 1 transferred through a route 1 first reaches the intersection node and is received (the sequence number of the packet 1 is within [1, L]), and meanwhile, the receiving range of the receiving window proceeds to [2, L+1]. Consequently, the packet 1 transferred through a route 2 reaching the intersection node later is discarded. Then, a packet 2, transferred through the route 1, reaches the intersection node earlier than the packet 2, transferred through the route 2, and is received, and, hence, the receiving range of the receiving window proceeds to [3, L+2]. Consequently, the packet 2 transferred through the route 2 reaching the intersection node later is discarded. After that, a packet 3 transferred through the route 1 fails to reach the intersection node for some reason (e.g. a failure of the route 1 occurs, or the like), and the packet 3 transferred through the route 2 reaches the intersection node and is received, and, hence, the receiving range of the receiving window proceeds to [4, L+3]. Thereafter, a packet 4 transferred through both the routes 1 and 2 fails to reach the intersection node. Then, a packet 5 transferred through the route 1 fails to reach the intersection node, and the packet 5 transferred through the route 2 reaches the intersection node and is received, and, hence, the receiving range of the receiving window proceeds to [6, L+5], and so forth.

The inventor discovers at least the following deficiencies of the aforementioned solution of the 1+1 service protection in the OBS networks of the prior art.

1. Since the OBS node cannot sufficiently delay the burst packet, if an end-to-end time delay difference between two risk-independent routes is too large, the function of the above 1+1 service protection solution cannot fully exerted. Therefore, applications of the above solution are restricted in a network with a large coverage area.

2. In the OBS networks, since the optical buffer is insufficient, the packet loss ratio of the burst packet is always far greater than that in the traditional electrical switching network. When data packets bearing some services are simultaneously transferred through two different routes, the best way is to utilize the characteristic that the packet loss ratios of the two routes are independent from each other, so as to reduce the packet loss ratio of the entire service. However, the above 1+1 protection solution obviously cannot achieve this. For example, when a propagation time delay difference between the two risk-independent routes is larger than a time difference between two burst packets sent from a service source node, the packet loss ratio of the above protection solution is approximately the packet loss ratio of the shorter route.

3. During the transfer of the burst packets, the burst packets may undergo a wavelength transformation, delay, and other processes at each of the nodes, so as to avoid the burst packet collision, and may probably undergo a shaping, amplification, and other processes, so as to optimize the signal quality. Therefore, at the sink node of a service, the signal qualities of multiple burst packets transferred through the same route are not definitely the same, and the signal quality of the burst packets transferred through the shorter route is not definitely better than that of the burst packets transferred through the longer route. Therefore, it is of important practical significance to select the burst packet having a better signal quality from two burst packets with the same content transferred through different routes, in order to provide better QoS for the services of higher service levels. However, the above 1+1 protection solution can only ensure that the service will not be cut down when a network failure occurs and is incapable of filtering, with respect to qualities, the optical signals transferred through the two different routes when the network operates normally.

SUMMARY

Accordingly, the embodiments of the present invention is directed to provide a 1+1 protection method of service in OBS networks, an intersection node apparatus, and a service protection system, thereby providing effective 1+1 protection to services in the OBS networks.

The objective of the embodiments of the present invention is achieved through the following technical solutions.

A 1+1 protection of service method in OBS networks is provided in an embodiment of the present invention, including the following steps.

Burst packets bearing service are transferred through two risk-independent routes. Each of the burst packets transferred through the two routes corresponds to one control packet, and the control packet is provided with a waiting time field for recording the waiting time of the control packet, a sequence number field for recording a sequence number of the burst packet corresponding to the control packet and a quality loss field for recording a signal quality loss of the control packet.

The intersection node of the two routes receives a first control packet from either route with a sequence number firstly, and when the intersection node receives a second control packet which is from the other route and has the same sequence number field value within the waiting time of the first control packet, the intersection node selects the burst packet corresponding to the control packet with a smaller quality loss field value, from the first and second control packets.

An intersection node apparatus disposed at an intersection node of two risk-independent routes in OBS networks is provided in an embodiment of the present invention. The two routes are adapted to transfer burst packets bearing service in need of a 1+1 protection in OBS networks. Each burst packet transferred through the two routes corresponds to one control packet. The control packet is provided with a waiting time field for recording the waiting time of the control packet, a sequence number field for recording the burst packet number corresponding to the control packet, and a quality loss field for recording a signal quality loss of the control packet. The intersection node apparatus includes a receiving module and a selecting module.

The receiving module is adapted to receive a first control packet with a sequence number field value from either route firstly, and receive a second control packet which is from the other route and has the same sequence number field value within the waiting time of the first control packet.

The selecting module is adapted to select a burst packet corresponding to the control packet with a smaller quality loss field value, from the first and second control packets.

A service protection system is provided in an embodiment of the present invention, including a sending device and a receiving device.

The sending device is adapted to transfer burst packets bearing service in need of a 1+1 protection in OBS networks through two risk-independent routes in the networks. Each burst packet transferred through the two routes corresponds to one control packet, and the control packet is provided with a waiting time field for recording the waiting time of the control packet, a sequence number field for recording the burst packet number corresponding to the control packet, and a quality loss field for recording a signal quality loss of the control packet.

The receiving device is adapted to receive the control packets sent by the sending device. The receiving device first receives a first control packet having a sequence number field value from either route firstly, and receive a second control packet which is from the other route and has the same sequence number field value within the waiting time of the first control packet, and selects the burst packet corresponding to the control packet with a smaller quality loss field value of the first and second control packets.

According to the above technical solutions provided by the embodiments of the present invention, regarding the service in need of a 1+1 protection, the burst packets bearing the service are transferred through two risk-independent routes. In this manner, when either route fails, the other route which operates normally maintains the normal transmission of the service, thereby preventing the service from being cut down. An appropriate waiting time is set for the control packet corresponding to each route, respectively, and the loss in signal quality of the corresponding burst packet is recorded in the control packet. Thus, when both the two routes operate normally, the burst packet with a better signal quality may be selected from the two burst packets with the same content transferred through the two different routes, thereby providing a better QoS for the services of higher service levels. In addition, by setting the appropriate waiting time for the control packets corresponding to the routes respectively, a large end-to-end time delay difference between the two routes may be accepted, and the packet loss ratio of the service may be effectively reduced.

BRIEF DESCRIPTION OF THE DRAWINGS

The present invention will be understood better from the detailed description given herein below for illustration only, and thus are not limitative of the present invention, and wherein.

DETAILED DESCRIPTION

Figure 1:
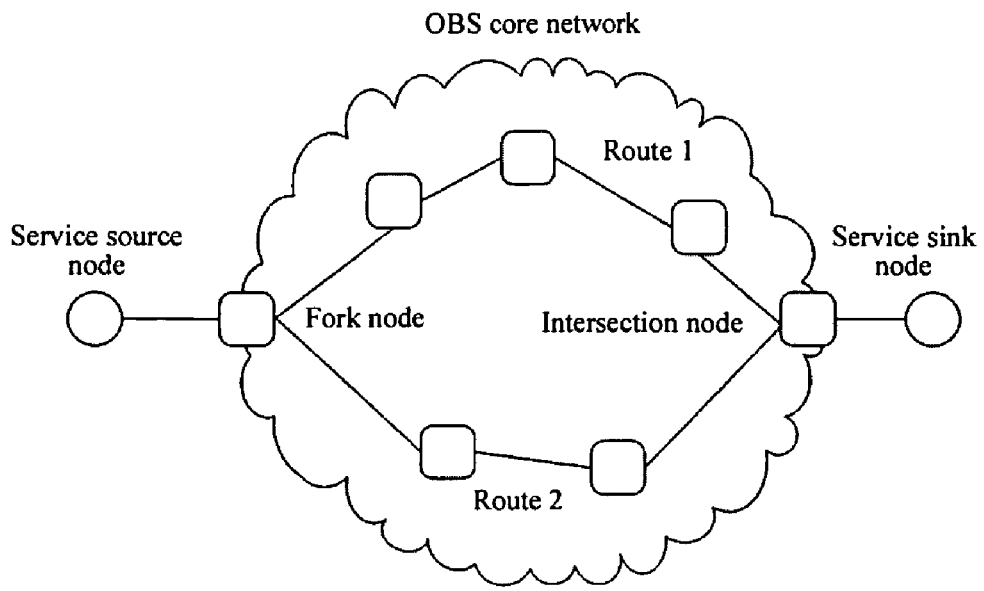
FIG. 1 is a schematic diagram illustrating a 1+1 service protection in OBS networks.
Figure 2:
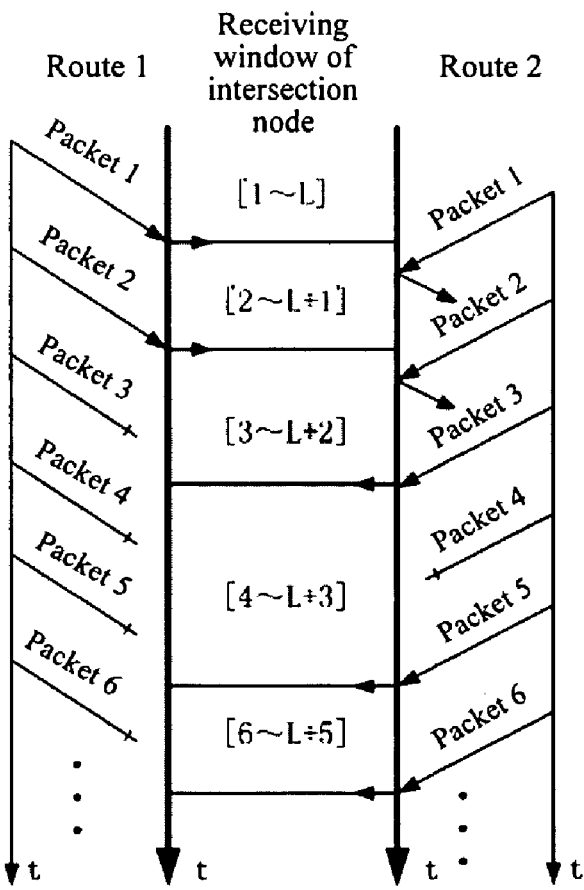
FIG. 2 is a schematic diagram illustrating processes of selecting a packet by a receiving window at an intersection node, according to a conventional MPLS 1+1 service protection strategy.

A 1+1 service protection method, an intersection node apparatus, and a service protection system in OBS networks are provided by the embodiments of the present invention. In the embodiments of the present invention, two risk-independent routes are selected for the service in need of a 1+1 protection. The two routes have the same fork node and intersection node in the direction from a service source node to a service sink node. For a burst packet bearing the service, two control packets respectively corresponding to the two routes are generated for the burst packet in an appropriate manner, and the burst packet is replicated to obtain two burst packets or the two burst packets may be obtained in other appropriate manners. Thus, the burst packets are transferred through the above two routes. Therefore, each of the burst packets transferred through the above two routes corresponds to a control packet.

In the embodiments of the present invention, the above two burst packets obtained by replication or in other appropriate manners have the same content and sequence number.

In the method provided by the embodiments of the present invention, the control packet is provided with a waiting time field for recording the waiting time of the control packet, a sequence number field for recording the burst packet number corresponding to the control packet, and a quality loss field for recording the loss in signal quality of the burst packet corresponding to the control packet. The waiting time of the control packet specifies a maximum amount of time that after receiving the control packet, the intersection node where the two routes converge together should wait for the other control packet transferred through the other route with the same sequence number field value as the received control packet carries. In this way, when one control packet having a certain sequence number field value transferred through either of the two routes reaches the intersection node where the two routes converge together earlier, the intersection node will wait according to the waiting time of the control packet. If the other control packet, which is transferred through the other route with the same sequence number field value as the reached control packet carries is received in the waiting time, the quality loss field values of the two control packets are compared, and the burst packet corresponding to the control packet having the greater quality loss field value is selected and the burst packet corresponding to the control packet having a bigger quality loss field value is discarded. Otherwise, the burst packet corresponding to the control packet transferred through a certain route and reached earlier is selected directly.

Therefore, the waiting time of the control packet is set in the following principle. Within the waiting time of the control packet, in the situation that both the two routes operate normally, after receiving one control packet transferred through one route, the intersection node where the two routes converge together is capable of receiving the other control packet transferred through the other route with the same sequence number field value as the firstly-received control packet carries. In addition, the sequence number of each burst packet with different contents is usually periodically cycled in a certain range, for example, in the range of 1-100. That is, the sequence number of the burst packets initiates from 1, and when the sequence number of the burst packet reaches 100, the sequence number of the following burst packets starts from 1 once again, and so forth. Therefore, the sequence number is preferred to be set in consideration of the actual conditions, so that the sequence numbers of the burst packets with different contents fall within a suitable range to ensure that after receiving a certain control packet, the intersection node where the two routes converge together will not receive the other control packet, which corresponds to the burst packet with a different content from that of the received control packet but having the same sequence number field value at least within the waiting time of the control packet. Therefore, the burst packets with different contents will not confuse the intersection node when selecting the burst.

Figure 3:
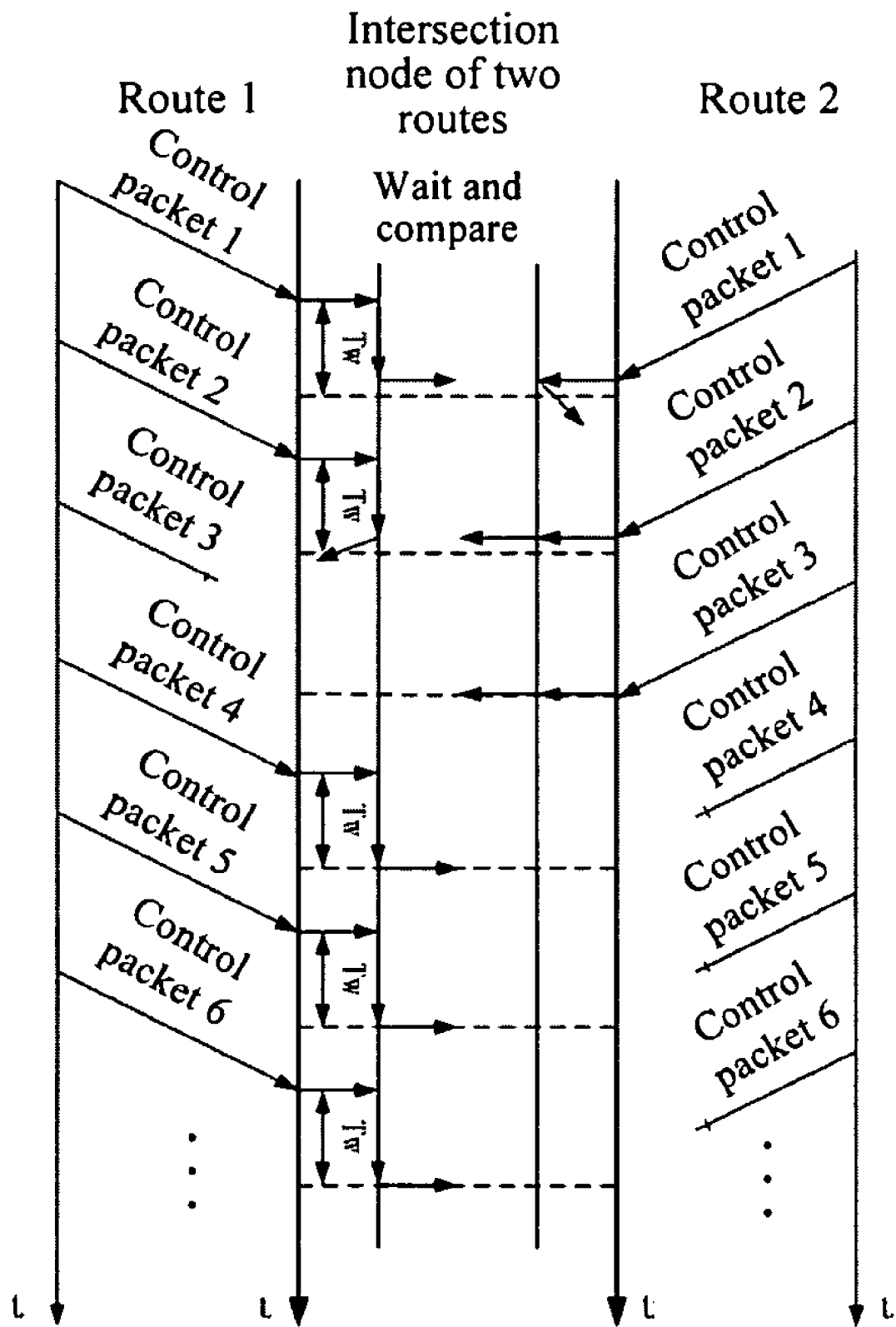
FIG. 3 is a schematic diagram illustrating a 1+1 service protection method in OBS networks, according to an embodiment of the present invention.

FIG. 3 is a schematic diagram illustrating a 1+1 service protection method in OBS, according to an embodiment of the present invention. In FIG. 3, processes of waiting at an intersection node of two routes and selecting a burst packet, according to the method of the present invention, are illustrated. A route 1 is assumed to have a shorter end-to-end time delay, a control packet corresponding to the route 1 has a waiting time of Tw, and a control packet corresponding to a route 2 has a waiting time of 0.

According to the method provided by the embodiment of the present invention, in the situation that both the two routes operate normally, when two burst packets with the same content and two control packets respectively corresponding the two burst packets are transferred through the two routes, respectively, neither of the two burst packets will reach the intersection node where the two routes converge together earlier than either of the two control packets. The above circumstance may be achieved by appropriately setting an offset time between each of the two burst packets and the control packet corresponding thereto. The offset time specifies the length of time the transmission of the burst packet lags behind the control packet corresponding thereto. The setting of the offset time will be illustrated below by taking example. The situation that both the two routes operate normally does not include the circumstance that a corresponding one of the two control packets ultimately fails to reach the intersection node or reaches the intersection node beyond the normal time limit due to the failure of a certain route. The normal time may be determined by a node hop count of the route through which the control packets pass, a time for each intermediate node on the route to process the control packet, and a safety time (for shielding the influence caused by the fluctuation of the time for each intermediate node on the route to process the control packet) that may be determined based on experiences.

The burst packet bearing service may be transferred through two routes in a different manner, depending on whether a fork node of the two routes is a service source node and the capability of the fork node, which will be illustrated as follows.

a) The fork node is the service source node.

In this situation, two control packets respectively corresponding to the two routes are generated for the burst packet bearing service at the service source node, and the two control packets are placed on the corresponding routes respectively for transfer. When reaching a preset offset time, the burst packet is replicated into two at the service source node and then the two burst packets are placed on the two routes, respectively, for transfer.

b) The fork node is not the service source node.

i. If the fork node has the ability to replicate one input burst packet bearing service to two output ports and is able to record a corresponding relationship between the service in need of 1+1 protection and the two routes in a routing table, the service source node may send only one burst packet and the control packet corresponding thereto. The time the burst packet lags behind the control packet corresponding thereto is equal to the preset offset time. After receiving the control packet sent by the service source node, the fork node of the two routes replicates the control packet and modifies the routing information, and then places the control packets on the two routes, respectively. After receiving the burst packet sent by the service source node, the fork node of the two routes directly replicates the control packet into two control packets in the optical domain and places the two control packets on the two routes, respectively.

ii. If the fork node has the ability to replicate the burst packet in the optical domain but poor routing ability, the fork node can only forward the control packet, according to the routing information in the input control packet, the service source node needs to send two control packets, respectively corresponding to the two routes for one burst packet bearing service. After receiving either of the control packets, the fork node forwards the control packet, according to the routing information contained in the control packet, and after receiving the burst packet, the fork node replicates the burst packet into two burst packets in the optical domain and places the two burst packets on the two routes, respectively.

iii. If the intermediate nodes of the OBS networks do not have the ability to replicate the burst packet in the optical domain, the service source node must send the control packets respectively corresponding to the two routes for one burst packet, and then send the burst packet bearing service twice. A time interval between the sending of the control packets corresponding to the routes and the corresponding burst packet is equal to the preset offset time.

In the above various situations, for one burst packet bearing service, two control packets corresponding to two different routes may be placed on the two routes for transfer at the same time or at different time. As for the latter, the sequence of sending the two control packets must be determined, according to the end-to-end time delays of their respective corresponding routes. The control packet corresponding to the route having the longer end-to-end time delay must be sent earlier, so as to reduce the difference of time at which the two control packets reach the intersection node where the two routes converge together.

In the embodiment of the present invention, the offset time is set for achieving the following purposes. In the situation that both the two routes operate normally, when two burst packets with the same content and two control packets respectively corresponding thereto are transferred through the two routes, respectively, neither of the two burst packets will reach the intersection node where the two routes converge together earlier than either of the two control packets. Therefore, the method provided by the embodiments of the present invention is more effective. The waiting time is set for achieving the following purposes. In the situation that both the two routes operate normally, after receiving the control packet transferred through one route, the intersection node where the two routes converge together is capable of receiving the other control packet transferred through the other route with the same sequence number field value as the firstly-received control packet carries within the waiting time of the control packet, so that the intersection node where the two routes converge together can make an effective selection.

The waiting time of the control packet may be set based on the respective end-to-end time delays of the two routes and the corresponding routes of the control packets. The setting of the above waiting time and offset time will be illustrated by way of example below.

Two risk-independent routes selected for the service in need of 1+1 protection are assumed to be R0 and R1, respectively. The actual situation of the two routes is assumed to allow two burst packets with the same content and two control packets respectively corresponding thereto to be placed on the two routes respectively at the same time for transfer. It is assumed that H0 and H1 are node hop counts of the routes R0 and R1, respectively, D0 and D1 are propagation time delays of the routes R0 and R1, respectively, and $\delta$ is an average time for the intermediate nodes on the two routes to process the control packet. An offset time between the control packet corresponding to either of the routes and the corresponding burst packet thereof may be set to be MAX (H0, H1) * $\delta$+|D0−D1|+T, where T is a safety time which may be determined based on experiences, for shielding an influence of the fluctuation of the time for the intermediate nodes on the two routes to process the control packet. The waiting time of the control packet corresponding to each route may be set as follows. If H1*$\delta$+D1>H0*$\delta$+D0, the waiting time value of the control packet corresponding to the route R0 is (H1-H0)*$\delta$+D1−D0+Ts, and the waiting time value of the control packet corresponding to the route R1 is max (Ts−((H1−H0) * $\delta$+D1−D0), 0); otherwise, the waiting time value of the control packet corresponding to the route R1 is (H0−H1) * $\delta$+D0−D1+Ts, and the waiting time value of the control packet corresponding to the route R0 is max (Ts−((H0−H1)* $\delta$+D0−D1), 0), where Ts is another safety time which may be determined based on experiences, for shielding an influence of the fluctuation of the time for the intermediate nodes on the two routes to process the control packet, and Ts<T.

Although the setting of the waiting time and the offset time is described under the condition that two burst packets with the same content and two control packets corresponding thereto are allowed to be placed on the two routes respectively at the same time, the above embodiments are not intended to limit the scope of the present invention in any way. Those of ordinary skill in the art would appreciate that the waiting time and offset time may be appropriately set according to specific situations, based on the aforementioned principles.

The way of calculating the loss in signal quality of a burst packet is illustrated below by taking example.

According to a preferred implementation of the embodiment of the present invention, at each intermediate node of the OBS networks, the transmission loss between the intermediate node and its neighboring nodes of each wavelength and an influence on the signal quality caused by various operations (including the wavelength conversion, delaying, shaping, amplification, etc.) performed by the intermediate nodes on the burst packet are stored. In this situation, the loss in signal quality of the burst packet corresponding to the control packet may be determined by each of the intermediate nodes on the route through which the control packet passes. In detail, when the control packet passes through a certain intermediate node, the intermediate node calculates the accumulated quality loss of the burst packet corresponding to the control packet starting from a source node to the output port of the current node and correspondingly changes the quality loss field value of the control packet, according to the transmission loss from a previous node to the current node, the loss in signal quality that will be introduced by the operation performed by the current node on the burst packet corresponding to the control packet, and the current quality loss field value of the control packet.

The intersection node apparatus provided by the embodiments of the present invention is disposed at an intersection node of two risk-independent routes in OBS networks. The two routes are adapted to transfer the burst packets bearing service in need of a 1+1 protection in OBS networks. Each burst packet transferred through the two routes corresponds to one control packet. The control packet is provided with a waiting time field for recording the waiting time of the control packet, a sequence number field for recording the burst packet number corresponding to the control packet, and a quality loss field for recording a signal quality loss. The intersection node apparatus includes a receiving module and a selecting module.

The receiving module is adapted to receive a first control packet with a sequence number field value from either route first, and then receive a second control packet which is from the other route and has the same sequence number field value as that of the first control packet within the waiting time of the first control packet.

The selecting module is adapted to select a burst packet corresponding to the control packet with a smaller quality loss field value of the first and second control packets.

The receiving module is further adapted to not receive the second control packet, which is from the other route and has the same sequence number field value as that of the first control packet within the waiting time of the first control packet; the selecting module is further adapted to select a corresponding burst packet of the first control packet.

The 1+1 service protection system in OBS networks provided by the embodiment of the present invention concretely includes a sending device and a receiving device.

The sending device is adapted to transfer burst packets bearing service in need of a 1+1 protection in OBS networks through two risk-independent routes in the networks. Each burst packet transferred through the two routes corresponds to a control packet, and the control packet is provided with a waiting time field for recording the waiting time of the control packet, a sequence number field for recording the burst packet number corresponding to the control packet, and a quality loss field for recording a signal quality loss.

The receiving device is adapted to receive the control packets sent by the sending device. The receiving device receives a first control packet having a sequence number field value from either route first, and receives a second control packet which is from the other route and has the same sequence number field value as that of the first control packet within the waiting time of the first control packet, and selects the burst packet corresponding to the control packet with a smaller quality loss field value of the first and second control packets.

The receiving device is further adapted to select a corresponding burst packet of the first control packet when not receiving the second control packet, which is from the other route and has the same sequence number field value as that of the first control packet within the waiting time of the first control packet.

Finally, it should be understood that the above embodiments are only used to explain, but not to limit the technical solution of the present invention. In despite of the detailed description of the present invention with referring to above preferred embodiments, it should be understood that various modifications, changes, or equivalent replacements can be made by those skilled in the art without departing from the spirit and scope of the present invention and covered in the claims of the present invention.

What is claimed is:

1. A 1+1 protection method of service in optical burst switching, OBS, networks, comprising:
    transferring burst packets bearing service through two risk-independent routes, wherein each of the burst packets transferred through the two routes corresponds to one control packet, and the control packet is provided with a waiting time field for recording the waiting time of the control packet, a sequence number field for recording a sequence number of the burst packet corresponding to the control packet, and a quality loss field for recording a signal quality loss of the control packet; and
    receiving first, by an intersection node of the two routes, a first control packet with a sequence number field value from either route, and when the intersection node receives a second control packet which is from the other route and has the same sequence number field value within the waiting time of the first control packet, selecting the burst packet corresponding to the control packet with a smaller quality loss field value of the first and second control packets.

2. The 1+1 protection method according to claim 1, further comprising:
    selecting, by the intersection node, the burst packet corresponding to the first control packet, when not receiving the second control packet which is from the other route and has the same sequence number field value within the waiting time of the first control packet.

3. The 1+1 protection method according to claim 1, wherein the signal quality loss of the burst packet corresponding to the control packet is determined by an intermediate node on the route through which the control packet passes, and when the control packet passes through an intermediate node, the intermediate node updates a current quality loss field value of the burst packet according to the signal quality loss of the burst packet caused by a transmission process of the burst packet from a previous node to a current node and operations of the current node on the burst packet.

4. The 1+1 protection method according to claim 1, wherein the waiting times of the control packets corresponding to the burst packets respectively transferred through the two routes are set, respectively, so that in the situation that both the two routes operate normally, the intersection node receives the first control packet firstly and is able to receive the second control packet within the waiting time of the first control packet.

5. The 1+1 protection method according to claim 4, wherein the waiting times of the control packets are set at least based on respective end-to-end time delays of the two routes and the routes corresponding to the control packets.

6. The 1+1 protection method according to claim 5, wherein the waiting times of the control packets are set at least based on the following items: respective node hop counts, respective propagation time delays, respective processing time of the intermediate nodes on the control packets and fluctuation thereof of the two routes, and the routes corresponding to the control packets.

7. The 1+1 protection method according to claim 1, wherein an offset time between the burst packets transferred through the two routes and the control packets corresponding to the burst packets is set, respectively, so that in the situation that both the two routes operate normally, neither of the burst packets transferred through the two routes reaches the intersection node earlier than anyone of the first and second control packets corresponding to the burst packets.

8. The 1+1 protection method according to claim 1, wherein a sequence number of each burst packet bearing service is set so that after receiving the first control packet, the intersection node does not receive the second control packet corresponding to the burst packet with a different content from the burst packet of the first control packet and having the same sequence number field value at least within the waiting time of the first control packet.

9. The 1+1 protection method according to claim 1, wherein the transferring burst packets bearing service through the two risk-independent routes is achieved by replicating the burst packet bearing service into two burst packets and then placing the two burst packets on the two routes, respectively.

10. The 1+1 protection method according to claim 2, wherein the transferring burst packets bearing service through the two risk-independent routes is achieved by replicating the burst packet bearing service into two burst packets and then placing the two burst packets on the two routes, respectively.

11. The 1+1 protection method according to claim 3, wherein the transferring burst packets bearing service through the two risk-independent routes is achieved by replicating the burst packet bearing service into two burst packets and then placing the two burst packets on the two routes, respectively.

12. The 1+1 protection method according to claim 4, wherein the transferring burst packets bearing service through the two risk-independent routes is achieved by replicating the burst packet bearing service into two burst packets and then placing the two burst packets on the two routes, respectively.

13. The 1+1 protection method according to claim 7, wherein the transferring burst packets bearing service through the two risk-independent routes is achieved by replicating the burst packet bearing service into two burst packets and then placing the two burst packets on the two routes, respectively.

14. The 1+1 protection method according to claim 8, wherein the transferring burst packets bearing service through the two risk-independent routes is achieved by replicating the burst packet bearing service into two burst packets and then placing the two burst packets on the two routes, respectively.

15. The 1+1 protection method according to claim 1, wherein the transferring burst packets bearing service through the two risk-independent routes is achieved by sending the burst packet bearing service twice.

16. The 1+1 protection method according to claim 2, wherein the transferring burst packets bearing service through the two risk-independent routes is achieved by sending the burst packet bearing service twice.

17. The 1+1 protection method according to claim 3, wherein the transferring burst packets bearing service through the two risk-independent routes is achieved by sending the burst packet bearing service twice.

18. The 1+1 protection method according to claim 4, wherein the transferring burst packets bearing service through the two risk-independent routes is achieved by sending the burst packet bearing service twice.

19. The 1+1 protection method according to claim 7, wherein the transferring burst packets bearing service through the two risk-independent routes is achieved by sending the burst packet bearing service twice.

20. The 1+1 protection method according to claim 8, wherein the transferring burst packets bearing service through the two risk-independent routes is achieved by sending the burst packet bearing service twice.

21. An intersection node apparatus, disposed at an intersection node of two risk-independent routes in optical burst switching, OBS, networks, wherein the two routes are adapted to transfer burst packets bearing service in need of 1+1 protection in OBS networks, each burst packet transferred through the two routes corresponds to one control packet, and the control packet is provided with a waiting time field for recording the waiting time of the control packet, a sequence number field for recording the burst packet number corresponding to the control packet and a quality loss field for recording a signal quality loss of the control packet, the intersection node apparatus comprising:
a receiving module adapted to receive a first control packet with a sequence number field value from either route first, and then receive a second control packet which is from the other route and has the same sequence number field value within the waiting time of the first control packet; and
a selecting module adapted to select a burst packet corresponding to the control packet with a smaller quality loss field value of the first and second control packets.

22. The intersection node apparatus according to claim 21, wherein:
the receiving module is further adapted to not receive the second control packet which is from the other route and has the same sequence number field value within the waiting time of the first control packet;
the selecting module is further adapted to select the burst packet corresponding to the first control packet.

23. A service protection system, comprising:
a sending device, adapted to transfer burst packets bearing services in need of 1+1 protection in optical burst switching, OBS, networks through two risk-independent routes in the networks, wherein each burst packet transferred through the two routes corresponds to one control packet, and the control packet is provided with a waiting time field for recording the waiting time of the control packet, a sequence number field for recording the burst packet number corresponding to the control packet and a quality loss field for recording a signal quality loss of the control packet; and
a receiving device, adapted to receive the control packets sent by the sending device, receive a first control packet with a sequence number field value from either route first, receive a second control packet which is from the other route and has the same sequence number field value within the waiting time of the first control packet, and select the burst packet corresponding to the control packet with a smaller quality loss field value of the first and second control packets.

24. The system according to claim 23, wherein the receiving device is further adapted to select the burst packet corresponding to the first control packet when not receiving the second control packet which is from the other route and has the same sequence number field value within the waiting time of the first control packet.

* * * * *